(12) United States Patent
Malpani (10) Patent No.: US 8,205,098 B2
(45) Date of Patent: Jun. 19, 2012

(54) SECURE AND USABLE PROTECTION OF A ROAMABLE CREDENTIALS STORE

(75) Inventor: Raghavendra Malpani, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1151 days.

(21) Appl. No.: 12/037,020

(22) Filed: Feb. 25, 2008

(65) Prior Publication Data

US 2009/0217056 A1    Aug. 27, 2009

(51) Int. Cl.
*G06F 12/14*      (2006.01)

(52) U.S. Cl. ............ 713/193; 713/166; 726/23; 726/27

(58) Field of Classification Search .................. None
See application file for complete search history.

(56) References Cited

U.S. PATENT DOCUMENTS

| | | | |
|---|---|---|---|
| 5,315,657 A * | 5/1994 | Abadi et al. ................ | 726/4 |
| 6,947,556 B1 | 9/2005 | Matyas, Jr. et al. | |
| 6,985,583 B1 * | 1/2006 | Brainard et al. ............ | 380/44 |
| 7,251,635 B2 * | 7/2007 | Lam et al. .................. | 705/79 |
| 7,370,166 B1 * | 5/2008 | Ramesh et al. ............ | 711/163 |
| 7,698,555 B2 * | 4/2010 | Jiang et al. ................ | 713/168 |
| 2001/0034837 A1 | 10/2001 | Kausik et al. | |
| 2002/0129283 A1 * | 9/2002 | Bates et al. ............... | 713/202 |
| 2004/0030932 A1 | 2/2004 | Juels et al. | |
| 2005/0278778 A1 | 12/2005 | D'Agostino et al. | |
| 2006/0010325 A1 | 1/2006 | Liu et al. | |
| 2006/0112283 A1 * | 5/2006 | Eldridge et al. ............ | 713/193 |
| 2006/0168653 A1 | 7/2006 | Contrera | |
| 2007/0014416 A1 | 1/2007 | Rivera et al. | |
| 2007/0016941 A1 | 1/2007 | Gonzalez et al. | |
| 2007/0033392 A1 | 2/2007 | Ganesan et al. | |
| 2007/0124321 A1 | 5/2007 | Szydlo | |
| 2007/0140489 A1 | 6/2007 | Dharmarajan et al. | |
| 2007/0157298 A1 | 7/2007 | Dingwall et al. | |
| 2007/0186099 A1 | 8/2007 | Beck et al. | |

FOREIGN PATENT DOCUMENTS

| | | |
|---|---|---|
| KR | 20050020906 (A) | 3/2005 |
| KR | 20050114293 (A) | 12/2005 |
| WO | WO2005002131 A1 | 1/2005 |

OTHER PUBLICATIONS

Basney, et al., "Credential Wallets: A Classification of Credential Repositories Highlighting MyProxy", pp. 1-20.
Gustafson, et al., "Securely Available Credentials", The Internet Society, Apr. 2004, pp. 1-11.
"Intelligent Public Key Credential Distribution and Workstation Access Control", TFS Technology, 2004, pp. 1-13.

* cited by examiner

*Primary Examiner* — Kaveh Abrishamkar
(74) *Attorney, Agent, or Firm* — Lee & Hayes, PLLC; Shirley L. Anderson; Bea Koempel-Thomas (57) ABSTRACT

A tool which facilitates a balancing of security with usability enabling secure user access to multiple secure sites and locations from several computing devices utilizing a roamable credential store (RCS) which is highly resistant to offline attack. The RCS facilitates a protected Unified Credential Vault (UCV) via a multi-stage encryption process such that user credentials are protected by making offline dictionary attacks prohibitively expensive to an attacker without causing usability to deteriorate commensurately.

19 Claims, 7 Drawing Sheets

SECURE AND USABLE PROTECTION OF A ROAMABLE CREDENTIALS STORE

BACKGROUND

Secure digital access to a multitude of sites accessible online such as online banking, shopping, and virtual private networks are desired in today's online society. User authentication reflects a typical process that people use to access such sites online. Generally, the process begins with a user browsing to a web site, determining that secure access is desired, and setting up a user-name and password/passphrase for the site. Each time the user wants to access the site, the user browses to the site, enters their user-name and password/passphrase, and upon the site matching the user-name and password/passphrase, gaining entry to the site.

Currently as an alternative to entering the user-name and password/passphrase each time the user browses to the site online, the user can allow storage of cookies on the browser to remember selected information by the browser on that device. Thus, the security of the user's information at the site online is governed by the security of the computing device and browser upon which the cookies are stored.

Variations of the user-name and password/passphrase entry process utilize answering predetermined questions and identifying predetermined images in addition to entering the user-name and password.

In either event, the user-name and password entry authentication process is only as secure as the strength of the user's chosen password/passphrase (i.e., high entropy, not easily guessed, meeting certain strength criteria) in view of the user's secure treatment of the password/passphrase, (i.e., not reusing passwords/passphrases, not writing down the password/passphrase, not storing passwords/passphrases in an easily determined location). Weak (i.e., low entropy) passwords/passphrases, are susceptible to dictionary and brute force attacks.

SUMMARY

Balanced security with usability facilitating secure user access to websites and other online locations from multiple computing devices utilizing a roamable credential store (RCS) is described herein. In an aspect of at least one embodiment, the RCS facilitates a protected Unified Credential Vault (UCV) via a multi-stage encryption process such that user credentials are protected by making offline dictionary attacks prohibitively expensive to an attacker without causing usability to deteriorate commensurately.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

BRIEF DESCRIPTION OF THE DRAWINGS

The same numbers are used throughout the disclosure and figures to reference like components and features.

DETAILED DESCRIPTION

Glossary

The following terms are used in this particular specification and, unless otherwise specified or clear from the context, the terms have the meanings provided below.

Brute force attack—An attempt to defeat a cryptographic scheme characterized by attempting to determine passwords/passphrases by submitting virtually all possibilities. Unlike dictionary attacks, brute force attacks are not based on inputs considered more likely to match passwords/passphrases.

Cost—A value in terms of time. For example, cost may be defined relative to seconds or milliseconds.

Credential—An encrypted entry comprising identification of a secure site, a user-name corresponding to the secure site, and a password/passphrase for accessing the secure site.

Dictionary attack—An attempt to defeat a cryptographic scheme characterized by attempting to determine passwords/passphrases by submitting a large number of possibilities based on words found in a dictionary which are most likely to match passwords/passphrases.

Expensive—A relative cost value. In terms of time, an expensive operation takes longer (costs more) than an inexpensive operation. For example, cost may be defined relative to the number of seconds or milliseconds necessary to complete an operation.

Key—A cryptographic key.

Lock—Requiring the proper key to gain access.

Offline attack—A cryptographic attack on a password when the would-be attacker has access to the protected container for a sufficient time to mount dictionary attack on the credentials store to retrieve secrets.

Overview

A roamable credential store (RCS) enables secure storage of multiple credentials belonging to an individual user in a roamable format via multi-stage encryption. In another aspect, the RCS facilitates leveraging a Unified Credential Vault (UCV) via a multi-stage encryption process to produce a protected UCV such that user credentials are protected by making offline dictionary attacks prohibitively expensive to a would-be attacker without commensurate increases in usability costs. In another aspect, the RCS provides users enhanced secure access on multiple computing devices. In another aspect, the RCS enables accelerated retrieval of information on selected computing devices.

An environment in which these tools may enable these and other techniques is set forth first below. Additional sections describe various inventive techniques and exemplary embodiments of the tools. These sections describe exemplary ways in which the inventive tools enable secure storage of multiple credentials belonging to an individual in a roamable protected UCV. Further sections describe processes of providing a secure and roamable protected UCV via multi-stage encryption such that a user's credentials are protected by dramatically increasing the costs of offline dictionary attacks for would be attackers while maintaining user acceptable time frames for execution. Yet additional sections describe processes of providing accelerated retrieval of information on selected devices which leverage enhanced secure access to users on multiple computing devices are described utilizing an entry comprising identification of a secure site, a user-name corresponding to the secure site, and a password/passphrase for accessing the secure site.

Producing a protected UCV includes deriving a key from a password for the protected UCV to protect the protected UCV. The protected UCV may enforce group security policies regarding password security as group security policies are known in the art. Furthermore, the protected UCV may allow users to set their own respective levels for password security. Regardless of the entropy of a user's password, the protected UCV incorporates iterative hashing in a password based key derivation function utilizing a salt, i.e., random bits, as one of the inputs to make dictionary attacks harder for would be attackers. For example, a password based encryption standard, such as PKCS5 applies iterative hashing and may be represented as K=pkcs5(n, s, p), where n=iteration count, s=salt, and p=password, such that K=a derived key. While PKCS5 is used as an example, other password based encryption schemes utilizing an iteration count are contemplated for use in the protected UCV.

The higher an iteration count is the harder performing a successful dictionary attack will be for a would-be attacker. This is because when the iteration count is very high, performing the offline dictionary attack can be made prohibitively expensive for most attackers where cost is calculated in terms of time. For example, when key derivation is made expensive—costing, for example 10 seconds on modern hardware—mounting offline attacks is difficult and expensive, taking close to 10 seconds to derive a key for each password guess. Furthermore, when for example, normal entropy is 40, an attacker would need 10 seconds for each of $2^{40}$ password attempts, or more than 348,000 years. Assuming the attacker can retrieve the correct key in ½ the time for all the password possibilities, then the attacker would still need $[(2^{40})/2)*10]_{seconds}$ to guess the password. Assuming the attacker takes advantage of known attributes in human created passwords, for example via Rainbow tables, then the attacker would still need more than 1,000 years to guess the password.

However, users are also adversely affected by high usability costs caused by key derivation using high iteration counts, where cost is calculated in terms of time. For example, users are not likely to accept waits of close to 10 seconds each time they must key a user-name and password to enter a secure site.

In the protected UCV, the key derivation may be implemented by the vault engine. In at least one embodiment, other suitable components may implement the key derivation. In an aspect of at least one embodiment, key derivation may be implemented as a multi-stage process of encryption. For example, in the first stage, a first key ($K_1$) may be generated by a local security authority which is a part of the trusted computing base. For example, the first key ($K_1$) may be derived using PKCS5 as described, above ($K_1$=pkcs5($n_1$, s, p)) with an iteration count of about 10 million and resulting in an exemplary cost of about 9.6 seconds. In the second stage, a second key ($K_2$) may be derived using a variation of PKCS5 such that $K_2$=pkcs5($n_2$, s, (p+$K_1$)) where (p+$K_1$) represents a concatenation of the entered password for the protected UCV and the first key. In an aspect of at least one implementation, concatenation comprises appending the first key to the password. In an aspect of at least one implementation concatenation comprises hashing the first key and the password. For example, in the second stage ($K_2$) may be derived with an iteration count of about 100,000 and a cost of about 100 milliseconds. In an aspect of at least one implementation the iteration count represented by $n_2$ is much smaller than that represented by $n_1$, ($n_2 \ll n_1$). In an aspect of at least one implementation the iteration count represented by $n_2$ may be a calculated derivation of that represented by $n_1$. In an aspect of at least one implementation the iteration counts represented by $n_2$, and $n_1$ are set to default values. In an aspect of at least one implementation the iteration counts represented by $n_2$ and/or $n_1$ are controlled by user entry. In an aspect of at least one implementation the iteration counts represented by $n_2$ and/or $n_1$ are controlled by an administrator. In each implementation the iteration count represented by $n_1$ should be maintained to make performing offline dictionary attacks prohibitively expensive for most attackers where cost is calculated in terms of time.

Once the second key is derived, the entry may be encrypted with the second key using a known encryption scheme, such as a symmetric cipher like Advanced Encryption Standard (AES) 256 or another Federal Information Processing Standard (FIPS) validated cipher, and stored as a credential in the protected UCV. The roamable credentials store (RCS) provides for storage of the first key in the user's profile on the local computing device facilitating accelerated subsequent accessing of the secure site utilizing the protected UCV (as described in detail, below). The second key is not stored in long-term storage. In an aspect of at least one implementation, after the entry comprising identification of a secure site, a user-name corresponding to the secure site, and a password/passphrase for accessing the secure site is encrypted and stored as a credential, the second key is destroyed. In an aspect of at least one implementation, the second key may be destroyed when the user logs out. In an aspect of at least one implementation, the second key may be destroyed responsive to user direction.

The roamable credential store (RCS) embodied on a roamable device having at least one credential stored thereon may be usable to facilitate accelerated access to the secure sites for which associated credentials are stored on the roamable device at other computing devices of the user's choice.

As part of the access process (described in detail below), a computing device accesses a roamable device and loads the protected UCV application programming interface (API). Although, according to at least one other aspect of at least one environment, the protected UCV API may be stored on a computing device. In an aspect of at least one embodiment, the protected UCV API facilitates accessing credentials upon a subsequent access of a secure site so that the later access to the same secure site may be accelerated. In another aspect of at least one embodiment, other interactions with the same secure site may also be enhanced.

When a user couples their roamable device comprising an RCS to another computing device, for example a computing device at work, at school, or at a library, in an aspect of at least one embodiment, the user may be prompted to indicate whether this is a computing device upon which the user wants to store information so that subsequent accesses to secure sites may occur more quickly. In the event that the user elects to speed subsequent secure access, the user enters the password for the protected UCV from which the first key may be derived. For example, deriving the first key may cost around 9.6 seconds. When the user elects to speed subsequent secure access, after the first key is derived, it may be stored in the user's profile or other location accessible by only the user as defined by the operating system of the computing device. In other words, the first key may be stored in a secure location on the local computing device. Based on the first key and the entered password, the second key may be derived. For example, deriving the second key after the first key has been derived may cost around 100 milliseconds. The first key can be safely stored on any computing device having a location for secure storage accessible by just the particular user.

Thus, subsequent access may be accelerated because the first key will not need to be derived on that device, and instead may be accessed for derivation of the second key. According to at least one embodiment, the usability cost for such subsequent access may also be approximately 100 milliseconds.

In an aspect of at least one embodiment, in the event that the user declines storing information, the user may be prompted for whether faster access for this particular session is desired. In the event that the user elects to speed access for the current session, the first and second keys may still be derived, as described above, but neither will be stored in long term storage. In an aspect of at least one embodiment, upon the user browsing to a secure site, the user will not be prompted for entry of an associated user-name and password because the first and second keys will have been derived, and the protected UCV unlocked.

In an aspect of at least one embodiment, when the first key has been stored on the local computing device and the user browses to a secure site for which a credential is stored on a coupled roamable device for which the second key has been derived, the user may be securely signed on to the site without having to enter the associated user-name and password by the browser calling protected UCV. In an aspect of at least one embodiment, another suitable application may call the protected UCV, for example a security application. In an aspect of at least one embodiment, when the first key has been stored on the local computing device and the user browses a secure site for which a credential is stored on a coupled roamable device for which the second key has not been derived in that browsing session, the second key will be derived. According to at least one embodiment, the usability cost for deriving the second key may be approximately 100 milliseconds.

Although the subject matter is described in language specific to structural features and/or methodological acts, it is to be understood that the subject matter defined in the appended claims is not necessarily limited to the specific features or acts or to the structural proximity or sequences described herein. Rather, the specific features and acts described are disclosed as exemplary forms of implementing the claims.

Exemplary Operating Environment

Before describing the tools in detail, the following discussion of an exemplary operating environment is provided to assist the reader in understanding at least one way in which various inventive aspects of the tools may be employed. The environment described below constitutes but one example and is not intended to limit application of the tools to any one particular operating environment. Other environments may be used without departing from the spirit and scope of the claimed subject matter.

Figure 1:
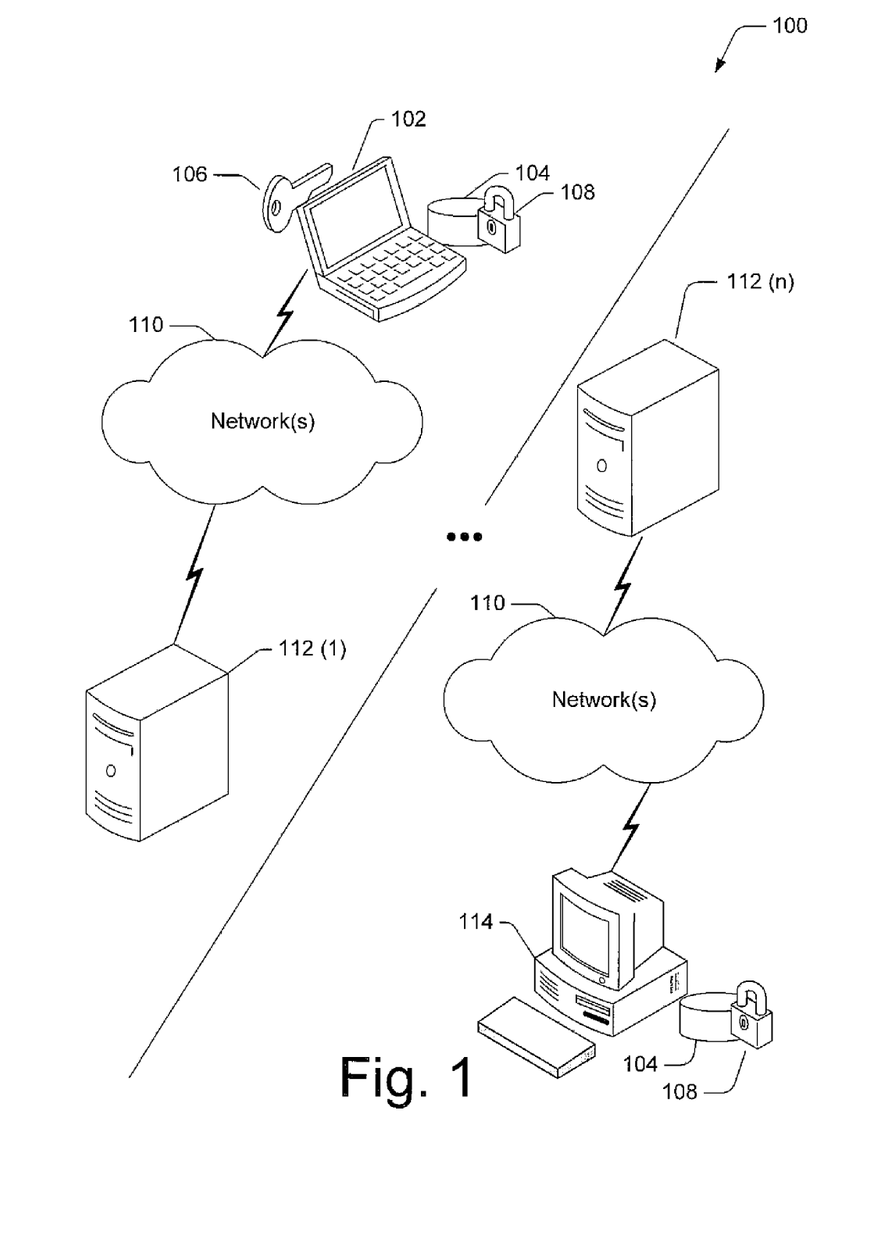
FIG. 1 illustrates an exemplary environment in which various embodiments of secure and usable protection of a roamable credentials store can operate.

FIG. 1 illustrates one such operating environment generally at 100 comprising at least a first computing device 102 having one or more processor(s) (not shown) and computer-readable media (not shown). The computer-readable media of computing device 102 may store one or more keys 106. The one or more keys 106 operatively secure the inventive protected Unified Credential Vault (UCV).

Computing device 102 may be one of a variety of computing devices, such as a cell phone, laptop computer, desktop computer, personal digital assistant, or server. Each computing device having at least one processor capable of accessing and/or executing instructions embodied on the computer-readable media. In at least one embodiment, the computer-readable media comprises or has access to a browser, which is a module, program, or other entity capable of interacting with a network-enabled entity. The computing device may also include input/output devices including a keyboard, mouse, microphone, printer, monitor, and speakers (not shown) useable to implement one or more embodiments of the tools described herein.

The operating environment 100 further comprises at least one roamable device 104. Roamable device 104 may be one of any number of suitable removable and/or portable devices, such as a universal serial bus (USB) device, a PC card, a thumb drive, a universal flash drive (UFD), a smartcard, a live drive, a mobile phone, an IEEE 1394 High Speed Serial Bus device, or a biometric enabled mass storage device. Each roamable device 104 comprises computer-readable media and is capable of interfacing with a computing device, similar to 102. Each roamable device having the capability of being accessed by one or more processors as a computer readable media. The roamable device 104 also operatively couples to other computing devices which may be the same type of computing device as 102, or can be different computing devices. The one or more keys 106 may be utilized on at least part of the information on the roamable device 104, such as the protected UCV, via multi-stage encryption enabling a lock 108 on at least a part of the roamable device 104.

Each of the computing device(s) 102 and roamable device(s) 104 interact via the inventive protected Unified Credential Vault (UCV). In at least one embodiment, the interaction occurs via coupling the roamable device 104 to the computing device 102. In another embodiment, such interaction occurs via wireless coupling of the computing device 102 and roamable device 104, for example via wireless protocols such as wireless USB, Bluetooth, infrared (IR), and other wireless and radio frequency (RF) communications protocols. In another embodiment, the interaction occurs via network 110 access between the computing device 102 and roamable device 104.

In some embodiments, the operating environment also comprises one or more network(s) 110 and server(s) 112 which include web servers 112. The network 110 enables communication between the computing device(s) 102 and the server(s) 112, and can comprise a global or local wired or wireless network, such as the Internet, a local area network (LAN), or an intranet. Computer-readable media of computing device 102 and/or roamable device 104, comprises or has access to a browser, which is a module, program, or other entity capable of interacting with a network-enabled entity.

The operating environment 100 may further comprise at least a second computing device 114 having one or more processor(s) and computer-readable media, similar to computing device 102. Each computing device 114 comprises a computing device similar to 102. The computing device(s) 114 may be the same computing device as computing device 102, or can be a separate or different computing device.

Recovery of information locked 108 on the roamable device 104 via a multi-stage encryption process is provided for via a number of methods. In an aspect of at least one embodiment, access is provided at least in part via a stored key 106. In another aspect of at least one embodiment access is provided at least in part via derivation of a new key 106. In yet another aspect of at least one embodiment access is provided via a combination of stored key(s) 106 and newly derived key(s) 106. In an aspect of at least one embodiment, each method presented provides increased security with less than commensurate deterioration of usability via a multi-stage encryption and decryption process for access to secure sites such as secure web sites, secure documents, and secure enterprise connections including online banking sites, online shopping sites, and virtual private networks.

Exemplary Operation

The following discussion describes exemplary ways in which the tools balance security with usability by facilitating secure user access to sites and locations from multiple computing devices utilizing a roam able credential store (RCS). The RCS facilitates a protected Unified Credential Vault (UCV) via multi-stage encryption such that user credentials are protected by making offline dictionary attacks prohibitively expensive to an attacker without causing usability to deteriorate commensurately.

Figure 2:
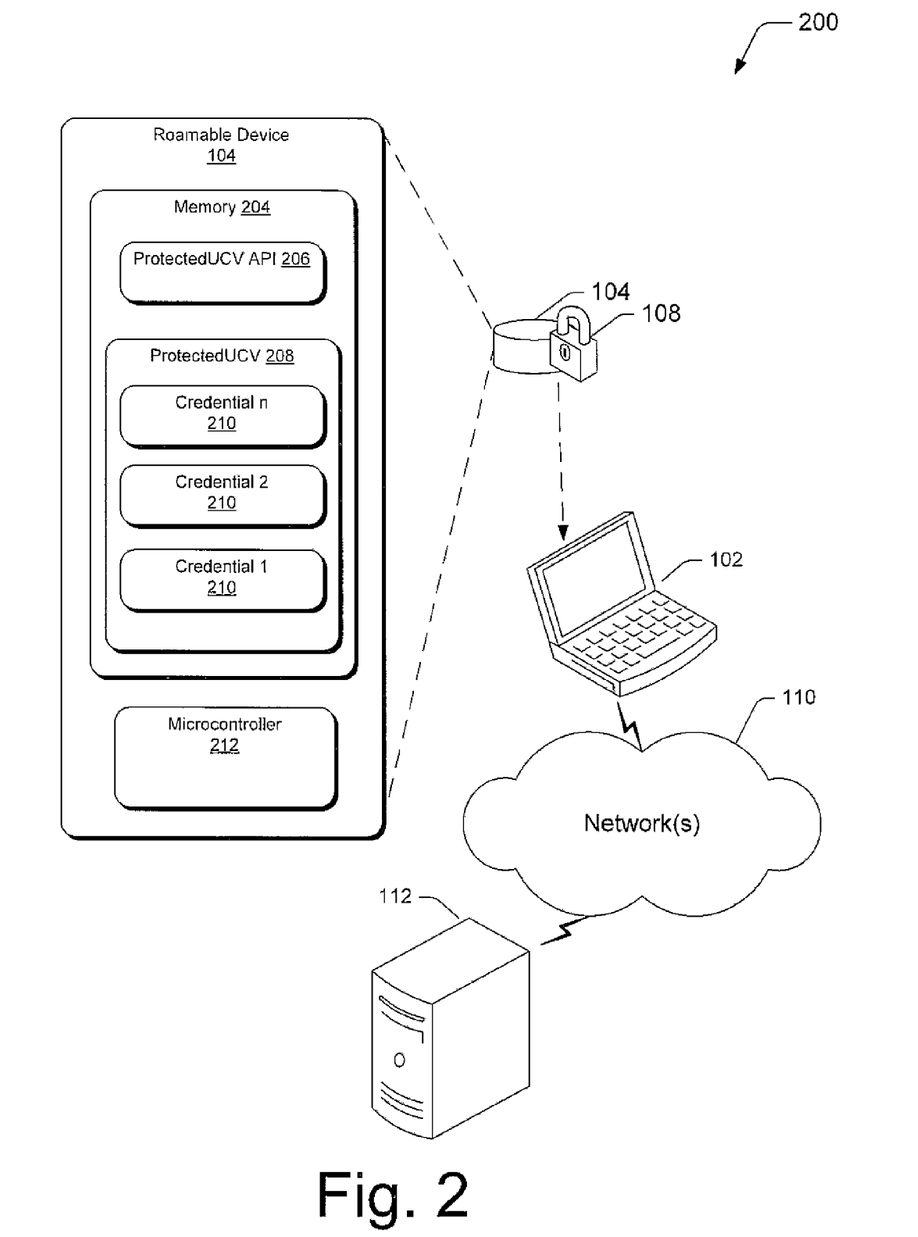
FIG. 2 illustrates an exemplary environment including an expanded roamable device for implementing a roamable credentials store of one embodiment.

FIG. 2 shows an exemplary expanded environment 200 that can implement the described processes and techniques and variations thereof. Environment 200 includes at least one computing device such as 102, introduced in FIG. 1. Also shown is locked 108 roamable device 104. In operation, roamable device 104 may be interfaced with computing device 102, and the computing device 102 populates and accesses a protected UCV stored in the memory 204 of the roamable device 104.

Memory 204 typically includes data, program modules and components for implementing the described processes that are immediately accessible to and/or presently operated on by microcontroller 212 and/or computing device 102. A multi-stage encryption process protects at least part of the information in roamable memory 204, the protected UCV 208. Correspondingly, a multi-stage decryption process provides for secure storage of credentials 210 in the protected UCV 208 facilitating accelerated and/or enhanced access to secure sites on multiple computing devices.

As part of the populating process (described further below), computing device 102 accesses memory 204 on roamable device 104 and loads the protected UCV application programming interface (API) 206 to memory 204. In another aspect of at least one environment, the protected UCV API need not be stored on roamable device 104. In an aspect of at least one embodiment, the protected UCV API 206 facilitates storing credentials 210 upon accessing a secure site so that future access to the same secure site may be accelerated. In another aspect of at least one embodiment, other interactions with the same secure site may be enhanced. Credential(s) 210 are defined as an encrypted entry comprising identification of a secure site, a user-name corresponding to the secure site, and a password/passphrase for accessing the secure site. For example, the entry may be encrypted with a particular key (described below) using a symmetric cipher such as Advanced Encryption Standard (AES) 256 or other Federal Information Processing Standard (FIPS) validated cipher. Other encryption schemes are contemplated for use in the protected UCV.

The populating process further includes creating the protected UCV 208 on a roamable device 104. Creating the protected UCV includes deriving a key from a password for the protected UCV to protect the protected UCV using iterative hashing as discussed above.

The roamable credential store (RCS) embodied oil the roamable device 104 having at least one credential stored thereon is usable to facilitate accelerated access to the secure sites for which associated credentials are stored on the roamable device 104 at other computing devices of the user's choice, such as computing device 114.

As part of the access process (described further below), computing device 102 accesses memory 204 on roamable device 104 and loads the protected UCV application programming interface (API) 206. Although, according to at least one other aspect of at least one environment, the protected UCV API may be stored on computing device 102. In an aspect of at least one embodiment, the protected UCV API 206 facilitates accessing credentials 210 upon a subsequent access of a secure site so that the later access to the same secure site may be accelerated. In another aspect of at least one embodiment, other interactions with the same secure site may also be enhanced.

When a user couples their roamable device 104 comprising an RCS to another computing device 114, in an aspect of at least one embodiment, the user will be prompted for whether this is a computing device upon which the user wants to store information so that subsequent accesses to secure sites may occur more quickly. In the event that the user elects to speed subsequent secure access, the user may enter the password for the protected UCV and the first key may then be derived and stored in a secure location on the local computing device. Based on the first key and the entered password, the second key may then be derived. The first key can be safely stored on any computing device having a location for secure storage accessible by the particular user. Thus, subsequent access will be accelerated because the first key will not need to be derived on that device, and instead may be accessed for derivation of the second key.

In an aspect of at least one embodiment, when the first key has been stored on the local computing device 114 and the user browses to a secure site for which a credential 210 is stored on a coupled roamable device 104 for which the second key has been derived, the user may be securely signed on to the site without having to enter the associated user-name and password by the browser calling protected UCV, for example a security application. In an aspect of at least one embodiment, another suitable application may call the protected UCV. In an aspect of at least one embodiment, when the first key has been stored on the local computing device 114 and the user browses a secure site for which a credential 210 is stored on a coupled roamable device 104 for which the second key has not been derived, the second key will be derived.

Exemplary System

Figure 3:
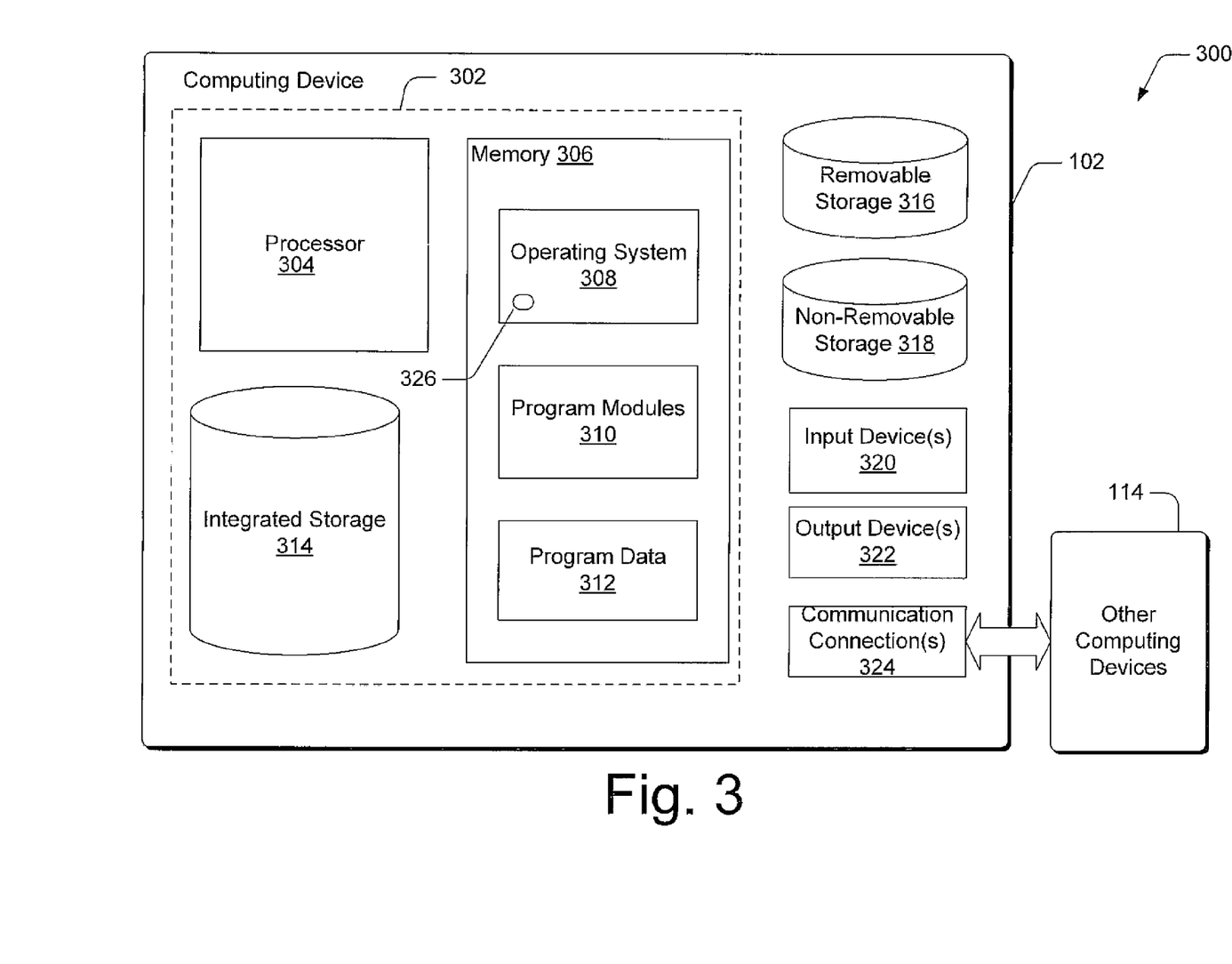
FIG. 3 illustrates an exemplary system of one embodiment of secure and usable protection of a roamable credentials store.

FIG. 3 illustrates an exemplary environment generally at 300 that may be used to implement part or all of various exemplary methods discussed herein. The description of environment 300 may include references to the environments of FIG. 1 and FIG. 2. The computing device shown in FIG. 3 is only one example of a computing device and is not intended to suggest any limitation as to the scope of use or functionality of the computing device and network architectures. Neither should the computing device environment be interpreted as having any dependency or requirement relating to any one or combination of components illustrated in the example computing device environment, such as computing device 102 and computing device 114. Computing device 102 comprises one or more processor(s) 304 and one or more memories 306.

Depending on the exact configuration and type of computing device, memory 306 may include a variety of computer-readable media other than roamable device 104. Computer-readable media can be any available media that can be accessed by a computing device such as computing device 102 and includes both volatile and nonvolatile media, removable and non-removable media. By way of example, and not limitation, computer-readable media comprises computer storage media, "Computer storage media" includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device such as computing device 102. Memory 306 typically includes an operating system 308, one or more program modules 310, and may include program data 312 and integrated storage 314. This basic configuration is illustrated in FIG. 3 by those components within dashed line 302.

The operating system 308 may include a component-based framework 326 that supports components (including properties and events), objects, inheritance, polymorphism, reflection, and provides an object-oriented component-based application programming interface (API). The .NET™, Framework manufactured by Microsoft Corporation, Redmond, Wash. is an example of such a framework, though it is by no means a limiting one.

Computing device 102 may have additional features or functionality. For example, computing device 102 may also include additional data storage devices (removable and/or non-removable) as discussed above. Such additional storage is illustrated in FIG. 3 by removable storage 306 and non-removable storage 308. Computer storage media may include computer readable media discussed above. Memory 306, removable storage 316 and non-removable storage 318 are all examples of computer-readable media. Any such computer storage media may be pail of computing device 102, shown and described with regard to FIG. 1.

Computing device 102 may also have input device(s) 320 such as keyboard, mouse, pen, voice input device (e.g. a microphone), touch input device, video input (e.g., a camera, a video camera), etch, and output device(s) 322 such as a display, speakers, printer, etc. Computing device 102 may also contain communication connections 324 that allow the device to communicate with other computing devices 114, such as over a wired or wireless network. The environment may also include one or more other storage units (not shown). Alternatively, one or more storage units may be combined. In at least one embodiment, each of these storage units may be located separate from the computing device 102 and accessible via a network. The description of environment 300 may include references to the environment of FIG. 2.

Figure 4:
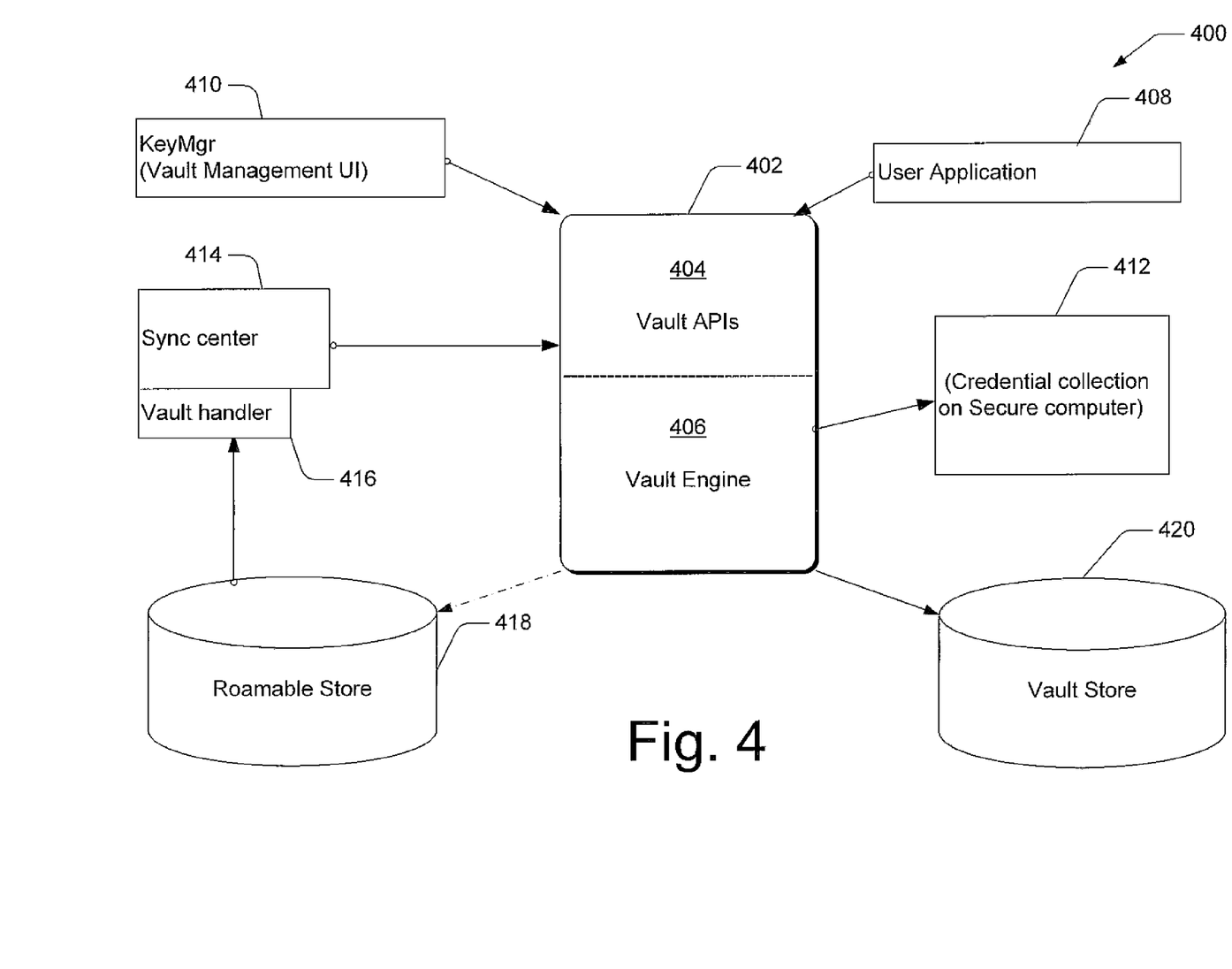
FIG. 4 illustrates an exemplary system of one embodiment of secure and usable protection of a roamable credentials store.

FIG. 4 illustrates an exemplary vault environment generally at 400 that may be used to implement pail or all of various exemplary methods discussed herein. The description of vault environment 400 may include references to the environment of FIG. 2. By way of example, and not limitation, the environment may include one or more vault(s) 402 comprising vault APIs 404 and vault engine 406. In an aspect of at least one embodiment a user application 408 interfaces with vault 402 via vault APIs 404 to get and set credentials 210. In another aspect of at least one embodiment a vault management user interface 410 interfaces with vault 402 to manage and update credentials 210. In another aspect of at least one embodiment a user interface provides for credential collection 412 on a secure computer, which interfaces with vault 402 via vault engine 406 providing a vault key user interface.

In another aspect of at least one embodiment a sync center 414 sets a synchronization partnership with vault 402 via vault APIs 404. In another aspect of at least one embodiment vault engine 406 provides a vault store interface to vault store 420. In another aspect of at least one embodiment vault engine 406 provides an interface to roamable store 418 enabling direct reading of credentials 210 from roamable store 418. In at least one embodiment the environment may also include one or more storage units comprising memory 204 on roamable device 104, roamable store 418, and vault store 420. Alternatively, one or more of these storage units may be combined. In at least one embodiment, each of these storage units may be located separate from the Roamable Credentials Store (RCS) and accessible via a network. In another aspect of at least one embodiment roamable store 418 interfaces with vault handler 416 for accessing credentials 210. In another aspect of at least one embodiment the vault engine uses an abstract storage (not shown) to submit vault data for long term storage in vault store 420. The data that the vault engine submits to the store is protected by a key derived by the user's password for the protected UCV.

Exemplary Processes

Figure 5:
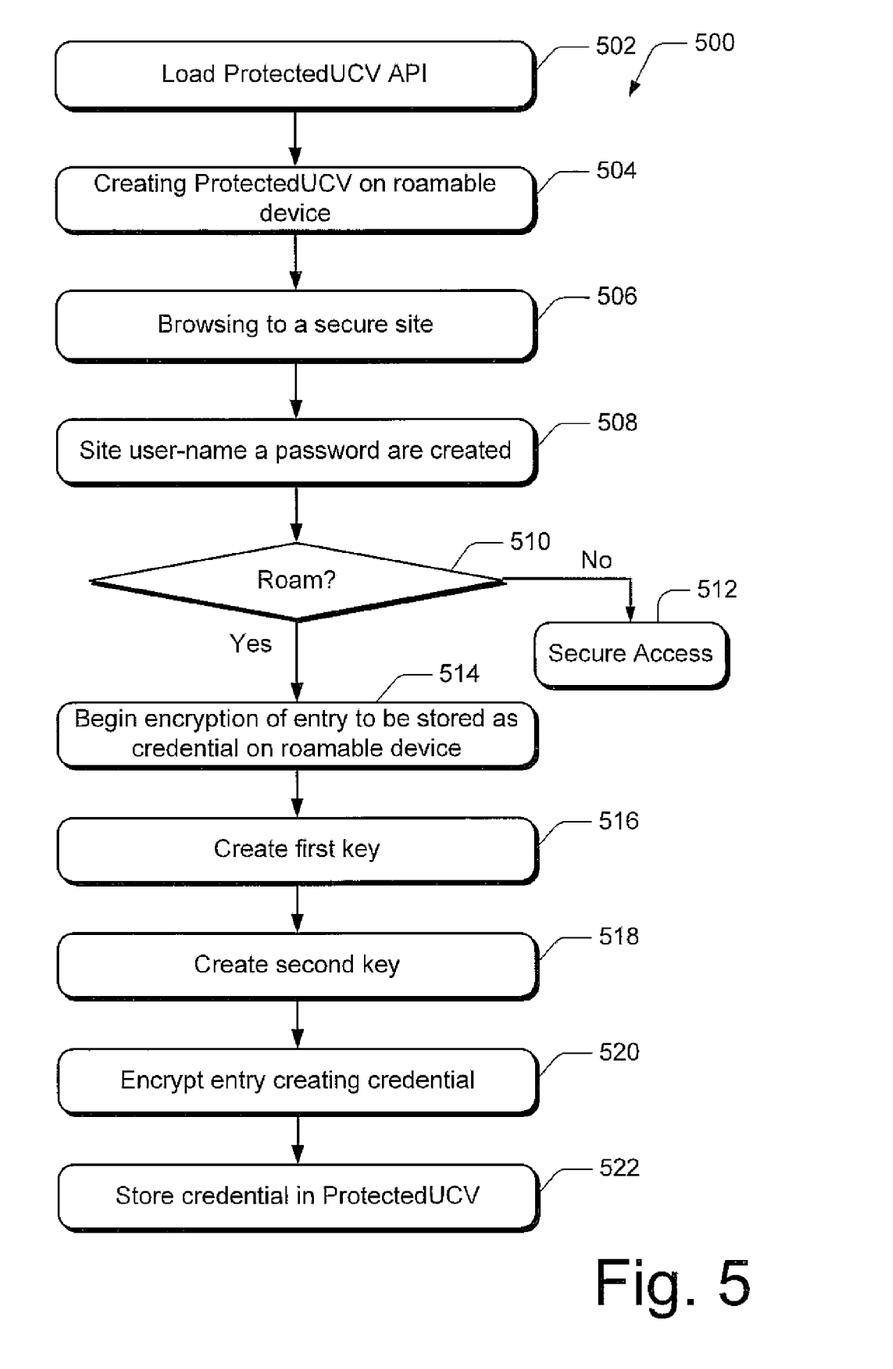
FIG. 5 is an exemplary process of storing user credentials in a unified credentials vault on a roamable credentials store utilizing one embodiment of secure and usable protection of a roamable credentials store.
Figure 6:
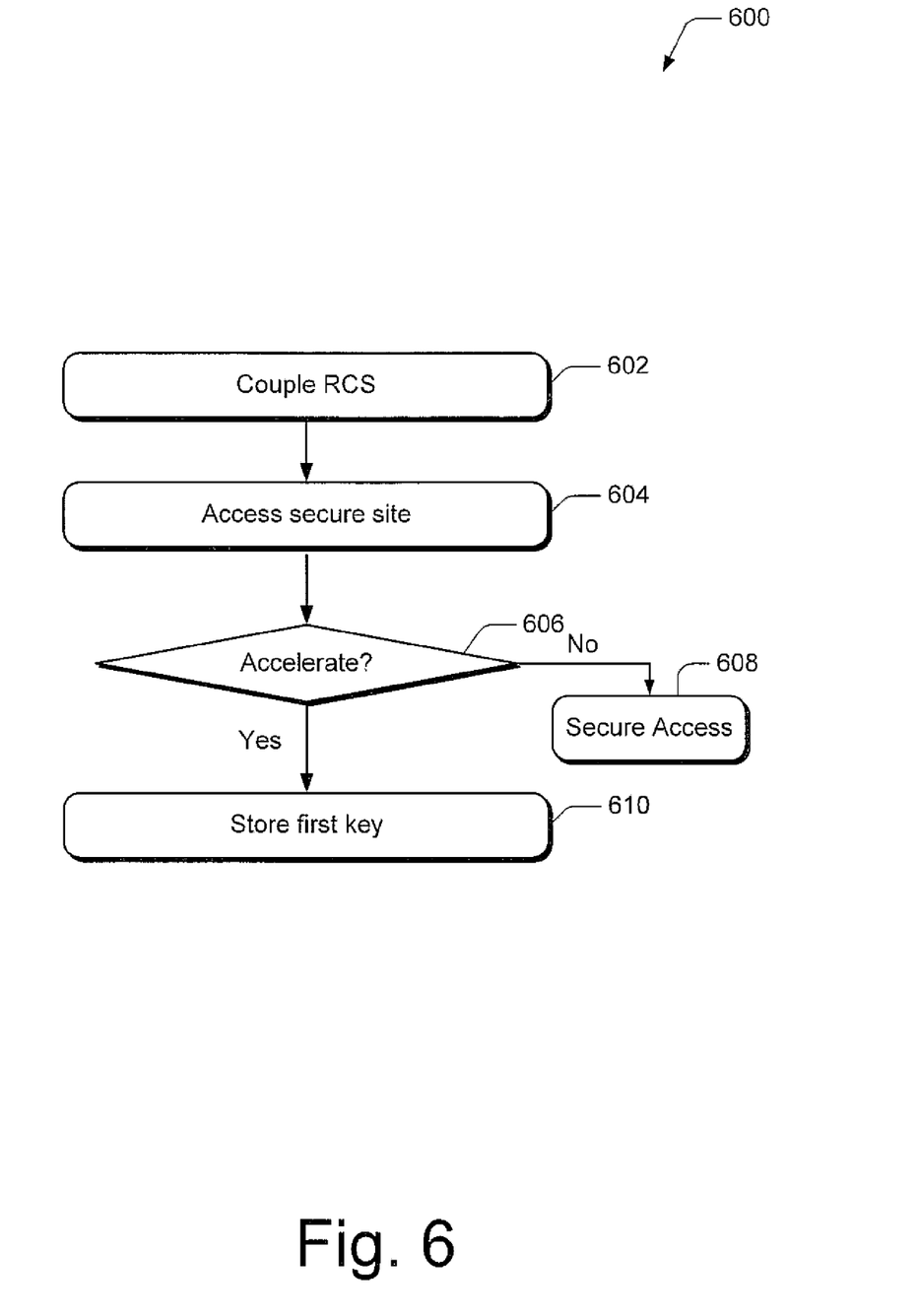
FIG. 6 is an exemplary process of accelerating subsequent secure access via storing a first key on a local computing device utilizing one embodiment of secure and usable protection of a roamable credentials store.
Figure 7:
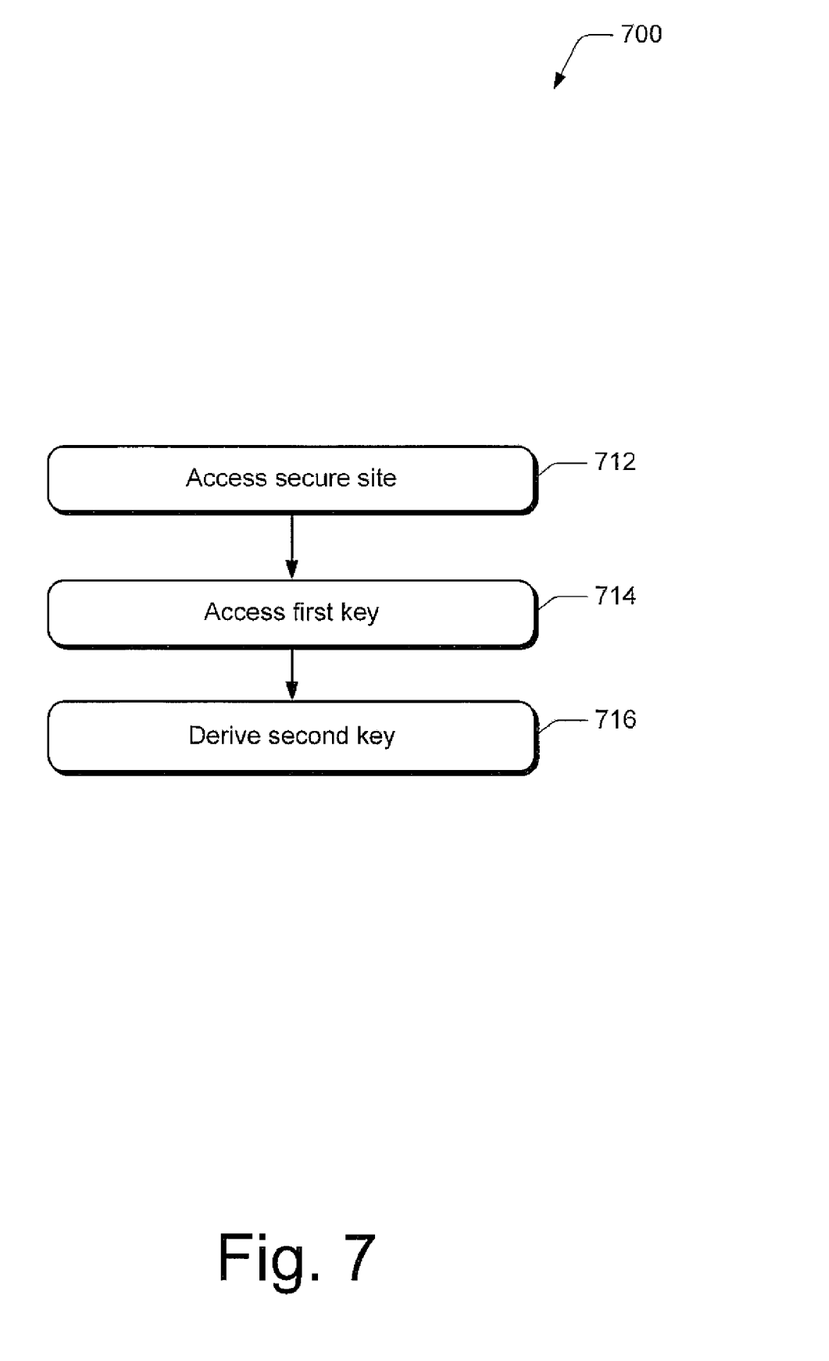
FIG. 7 is an exemplary process of accelerating subsequent secure access via accessing a stored first key on a local computing device utilizing one embodiment of secure and usable protection of a roamable credentials store.

Exemplary acts of operation are described herein with reference to FIGS. 5-7. As with all processes described herein, the order in which the acts are described and depicted in the corresponding figures is itself exemplary and should not be construed as limiting the order in which the actions occur.

FIG. 5 is an exemplary process 500 describing at least one embodiment of storing user credentials in a unified credentials vault on a roamable credentials store. This embodiment is illustrated as a series of blocks representing individual operations or acts performed by elements of operating environment 100 of FIG. 1, such as computing device 102. The description of process 500 may also include references to the environment of FIG. 2. Process 500 may act in conjunction with or be an implementation of the RCS.

Block 502 represents the protected UCV application programming interface (API) 206 being loaded to memory 204 upon the coupling of a roamable device 104. Upon the protected UCV application programming interface (API) 206 being loaded, the protected UCV 208 is created on roamable device 104 at block 504 via entry of a password for the protected UCV. At block 506, a browser on computing device 102 may be directed to a secure site online. At block 508, a site user-name and password are entered. At decision block 510, a determination is made of whether roamable access to the site is desired. When roamable access is not indicated, secure access to the site continues at block 512. When roamable access is indicated, encryption of an entry comprising identification of a secure site, a user-name corresponding to the secure site, and a password/passphrase for accessing the secure site is begun at block 514. At block 516, a password encryption scheme using high count iterative hashing is applied to create a first key. At block 518, a password encryption scheme using iterative hashing with a lower count and the first key is applied to create a second key. At block 520, the entry is encrypted using the second key to create a credential 210. At block 522, the credential 210 is stored in protected UCV 208. A user having stored a credential 210 such as at block 522 may now roam to other computing devices, such as 114.

FIG. 6 illustrates an exemplary process 600 describing at least one embodiment of accelerating subsequent secure access via storing a first key such as key 106 on a local computing device. This embodiment is illustrated as a series of blocks representing individual operations or acts performed by elements of operating environment 100 of FIG. 1, such as computing devices 102 or 114. Process 600 may act in conjunction with or be an implementation of the RCS.

Block 602 represents coupling an RCS in accordance with the present application to a computing device such as computing device 102. Block 604 represents accessing a secure site, as discussed in regard to FIG. 5. Decision block 606 represents prompting for accelerated subsequent access of a currently accessed secure site. When accelerated subsequent secure access is not indicated, secure access to the site continues at block 608. When accelerated subsequent secure access is indicated, the first key (as derived in block 516 of FIG. 5) is stored, for example in a local user profile at block 610. Thus, subsequent access may be accelerated because the first key will not need to be derived on that device, and instead may be accessed for derivation of the second key causing the usability cost for subsequent access to be greatly reduced from that of the initial access.

FIG. 7 illustrates an exemplary process 700 describing at least one embodiment of accelerating subsequent secure access via storing a first key such as key 106 on a local computing device. This embodiment is illustrated as a series of blocks representing individual operations or acts performed by elements of operating environment 100 of FIG. 1, such as computing devices 102 or 114. Process 700 may act in conjunction with or be an implementation of the RCS.

Block 712 represents a subsequent access of a secure site when the first key has been stored locally (as in block 610 of FIG. 6). The first key is accessed from the local profile having a negligible usability cost at block 714. At block 716, the second key is derived utilizing the stored first key providing accelerated subsequent access. In an aspect of at least one embodiment process 700 occurs immediately after process 600 of FIG. 6. In another aspect of at least one embodiment, process 700 occurs at a subsequent user access of a computing device such as computing device 102 or computing device 114.

CONCLUSION

The above-described systems and methods ("tools") enable balancing security with usability facilitating secure user access to sites and locations from multiple computing devices utilizing a roamable credential store (RCS). These and other techniques described herein may provide significant improvements over the current state of the ah, potentially providing more secure access to multiple secure sites on multiple computing devices and potentially providing a better user experience by lowering the usability costs for such secure access.

Although the system and method has been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

The invention claimed is:

1. A method of securing user credentials in a roamable credentials store, the method comprising:
generating a first key based on a predetermined first iteration count, a salt, and a user password;
generating a second key based on a predetermined second iteration count, the salt, and a concatenation of the user password and the first key, wherein the predetermined second iteration count is less than the predetermined first iteration count;
storing the first key in a user profile on a local computer;
creating a unified-credentials-vault (UCV) to protect an encrypted credential such that dictionary attacks become expensive for a potential attacker;
encrypting a location, a location-specific user-name, and a location specific password with the second key resulting in the encrypted credential; and
storing the encrypted credential in the UCV.

2. The method of claim 1, wherein the predetermined first iteration count represents a default value.

3. The method of claim 1, wherein the predetermined first iteration count represents a user selected level of security.

4. The method of claim 1, wherein the salt used in generating the second key is different than the salt used in generating the first key.

5. The method of claim 1, wherein the generating of the first key occurs in a local security authority (LSA), wherein the LSA is a part of the trusted computing base (TCB).

6. The method of claim 5, wherein the first key and the second key are only accessible to programs known to the TCB.

7. The method of claim 1, wherein the user password complies with a group policy.

8. The method of claim 1, wherein the second key is destroyed at user log-out such that the second key is not stored in long-term storage.

9. The method of claim 1, wherein the second key is destroyed responsive to user input.

10. The method of claim 1, wherein the second key is destroyed after a single use.

11. A method of protecting a roamable credentials store, having minimal impact on usability, the method comprising:
receiving a unified-credentials-vault (UCV), which provides secure storage of multiple encrypted credentials belonging to a user;
prompting for a password, wherein the password is a UCV password;
determining whether a first key based on the UCV password exists in storage;
in an event that the first key based on the UCV password does exist in storage, accessing the first key; and
deriving a second key based on a salt, a concatenation of the UCV password and the first key, and a second predetermined iteration count, wherein the second predetermined iteration count is less than the first predetermined iteration count.

12. The method of claim 11 further comprising utilizing the second key to securely access an encrypted credential in the UCV, wherein the encrypted credential represents a location, a location-specific user-name, and a location-specific password.

13. The method of claim 12, wherein the secure access of the encrypted credential in the UCV causes a browser to call an API.

14. The method of claim 12, wherein the secure access of the encrypted credential in the UCV causes a browser to securely access the location represented in the encrypted credential.

15. The method of claim 14, wherein accessible locations comprise:
websites,
secure nodes; and
enterprise connections.

16. The method of claim 11 further comprising:
in an event that the first key based on the UCV password does not exist in storage, deriving the first key based on:
the UCV password;
a salt; and a first predetermined iteration count; and responsive to deriving the first key, determining whether the first key should be stored locally.

17. The method of claim 12, wherein the second key is destroyed at user log-out such that the second key is not stored in long-term storage.

18. The method of claim 12, wherein the second key is destroyed responsive to user input.

19. The method of claim 12, wherein the second key is destroyed after a single use.

* * * * *